United States Patent [19]
Christiansen et al.

[11] Patent Number: 5,667,547
[45] Date of Patent: Sep. 16, 1997

[54] METHOD FOR MANUFACTURE OF QUARTZ GLASS PLATES

[75] Inventors: Uwe Christiansen, Gelnhausen; Anton Steinkohl, Gründau, both of Germany

[73] Assignee: Heraeus Quartzglas GmbH, Hanau, Germany

[21] Appl. No.: 410,612

[22] Filed: Mar. 24, 1995

[30] Foreign Application Priority Data

May 26, 1994 [DE] Germany .................. 44 18 401.8

[51] Int. Cl.[6] .................................................. C03B 20/00
[52] U.S. Cl. ........................... 65/17.4; 65/17.6; 65/90; 65/97
[58] Field of Search .................... 65/17.4, 17.3, 65/17.2, 17.6, 90, 97, DIG. 8

[56] References Cited

U.S. PATENT DOCUMENTS

| | | | |
|---|---|---|---|
| 3,473,904 | 10/1969 | Kraemer et al. | 65/22 |
| 4,363,647 | 12/1982 | Bachman et al. | 65/18.2 |
| 4,612,023 | 9/1986 | Kreutzer et al. | 65/32.5 |

FOREIGN PATENT DOCUMENTS

| | | |
|---|---|---|
| 153503 | 7/1904 | Germany . |
| 542682 | 3/1932 | Germany . |
| 3226451 | 1/1984 | Germany . |
| 52-069423 | 6/1977 | Japan . |
| 03164438 | 10/1991 | Japan . |
| 455331 | 2/1992 | Japan . |
| 2184434 | 6/1987 | United Kingdom . |

*Primary Examiner*—Donald E. Czaja
*Assistant Examiner*—Sean Vincent
*Attorney, Agent, or Firm*—Felfe & Lynch

[57] ABSTRACT

A layer of quartz glass soot is deposited continuously on a substrate consisting of quartz glass grains with a lower degree of sintering activity than the quartz glass soot and the soot is sintered by passing it continuously through a heating zone to form a quartz glass strip which is severed to form plates. Apparatus for implementing the process includes a conveyor suitable for the transport of quartz glass grains; a loading device for the deposition of the quartz glass grains onto the conveyor; nozzles for depositing a layer of synthetic quartz glass soot on the quartz glass grains; and a heating unit to heat the layer.

9 Claims, 1 Drawing Sheet

METHOD FOR MANUFACTURE OF QUARTZ GLASS PLATES

BACKGROUND OF THE INVENTION

The invention pertains to a process and to a system for the production of plates of quartz glass.

It is known that, to obtain plate material, slices can be sawed off from quartz glass blocks, which are very expensive to produce primarily because of the large amount of energy which must be consumed. After a post-treatment of the cut surfaces, the plates thus produced meet stringent requirements with respect to surface quality and flatness. The cutting tools used for sawing, however, are very expensive. The production of the blocks and the sawing operation itself are extremely time-consuming and associated with the loss of materials. The thinner the plates sawed from the blocks, the greater the loss of material.

A process for the production of quartz glass plates is known from GB-A 2,184,434, in which a quartz glass tube is slit open in the longitudinal direction and then softened to form it into a plate. The plates thus produced, however, are not flat. Small depressions and elevations remain after the shaping process.

Another process for the production of plates of quartz glass and a system for implementing the process are known from DE-A1 32 26 451. In this case, a solid cylinder of quartz glass is lowered into a furnace, where it is heated to temperatures of 1,700°#1,900° C. to melt it. The flow of molten glass is guided into a graphite crucible. After cooling, the quartz glass obtained from the furnace can be removed from the graphite crucible as a plate. The plate thus produced is characterized by a high level of optical homogeneity. The production process, however, consumes a great deal of time and energy.

All of the processes cited above demand the production of a precursor, from which the plate must then be obtained by a series of complicated operations. DE PS 153,503 describes a process for the production of shaped products such as quartz glass plates, according to which quartz sand is spread over a substrate, possibly of quartz sand also, and then melted point by point with an electric arc. As a result, cohesive areas of vitreous quartz sand are obtained in the form of a plate. The optical quality of such plates, however, is very poor.

A process and a system are also known from U.S. Pat. No. 4,363,647, where a flat layer of quartz glass soot is deposited continuously by means of a series of hydrolysis burners onto a support body such as presintered, vitrified sand or highly pure quartz glass; the soot is then vitrified by means of a ribbon-flame burner to produce a quartz glass plate. The soot layer can be vitrified over its entire thickness. As this is done, it fuses to the support body. By means of the known process, it is therefore possible to produce $TiO_2$-containing compressive strain layers on glass plates. The support body can also be mechanically removed again, but this is a complicated and extremely difficult operation, especially when the layers of glass are thin. If the soot layer is not supposed to become fused to the support body, the heat must be turned off before the melting front reaches the support body. The melting front, however, is not even. Its progress depends on the local density of the soot layer and on the local heat output. If the heat is turned off before the soot layer has melted all the way through, therefore, certain areas of soot will remain unvitrified, which is unavoidable. As a result, the glass plate obtained will be uneven, although it can be removed easily from the support body.

In the patent abstract of JP-A 4-55331 (Patent Abstracts of Japan C-948, Jun. 8, 1992, Vol. 16, No. 249), the batchwise production of $SiO_2$ glass panes is described. In this case, layers of granular quartz glass are separated from each other by layers of porous $SiO_2$ bodies; these layers are stacked on top of each other and sintered. The separating layers are intended to prevent the quartz glass layers from fusing together and to facilitate the elimination of gas from the granular quartz glass. As a result of the weight of the layers on top, however, the layers of granular quartz glass at the bottom are compacted and therefore sinter more quickly. As a result, there is the danger that the separating layers at the bottom will sinter together with the granular quartz glass between them to form a homogeneous block before the upper layers are sintered all the way through.

SUMMARY OF THE INVENTION

The present invention is based on the task of providing a process by means of which plates of quartz glass of high optical quality can be produced at low cost and on the task of providing apparatus for the production of these plates.

With respect to the process for the continuous production of plates of quartz or high-silica glass, a layer of quartz glass soot is continuously deposited onto a substrate consisting of quartz glass grains which have a lower degree of sintering activity than the quartz glass soot, whereupon the soot is sintered to form a quartz glass strip as it is being conducted continuously through a heating zone.

The continuous deposition of a layer of quartz glass soot and the continuous introduction of this layer into a heating zone result in an economical, continuous method for the production of quartz glass plates. The use of quartz glass grains as a substrate for the quartz glass soot guarantees good thermal insulation for the amorphous soot during sintering, and it prevents the sintered quartz glass strip from sintering to its substrate. At the same time, atomic impurities such as those which could escape from a substrate are prevented from diffusing into the glass.

Because the quartz glass grains have less sintering activity than the quartz glass soot, it becomes possible to sinter the layer which contains the quartz glass soot almost exclusively, i.e., involving little or no substrate material. The differences between the sintering activity of the soot and that of the granular material, both of which have the same composition, can be attributable, for example, to differences in their particle sizes or to differences in the amounts of crystalline phase in the particles. In a preferred process the grains have a specific BET-surface area which is not above 5 $m^2/g$, preferably not above 1 $m^2/g$. In contrast to this the silica soot has a BET-surface area of about 100 $m^2/g$. So the BET surface of the soot is 20 to 100 times higher than the BET-surface of the grains, whereby the soot exhibits a higher degree of sintering activity than the grains. That is, the temperature at which the soot particles begin to fuse together is not sufficient to fuse the grains.

The process according to the invention has shown itself to be especially suitable for the continuous production of plates of synthetic quartz or high silica glass. A layer of synthetically produced quartz glass soot is deposited on a substrate of quartz glass grains, consisting of presintered, synthetic quartz glass soot. Because of the small average particle size, synthetically produced amorphous quartz glass soot usually has a very high sintering activity. A layer of this amorphous, dispersed quartz glass soot contacts on sintering. The adhesion of the quartz glass soot to the substrate of quartz glass grains, however, prevents the soot layer from contracting in the lateral direction. As a result, essentially only the thickness of the layer decreases during sintering.

An advantageous way to reduce the sintering activity of the quartz glass grains is to presinter synthetic quartz glass soot to obtain a specific surface area smaller than that of the original grains and a larger average particle size. Particle size distributions in the range of 30–350 μm have been found favorable. If the particles of the granular quartz glass are below this range, there is the danger that the amorphous quartz glass soot will sinter onto the substrate; if the particles are above the indicated range, the quartz glass powder layer will not adhere to the substrate sufficiently. The thickness of the layer of the quartz glass grains is advantageously in the range of 40–80 mm.

With respect to optical freedom from bubbles and the purity of the plates to be produced, it is advantageous for the quartz glass grains used to have the same chemical composition as the quartz glass soot.

The process can be carried out in a very economical manner by depositing the layer directly on the quartz glass grains by means of a gas-phase reaction. This can be done very easily by means of one or more hydrolysis burners which are moved back and forth over the substrate to deposit a uniformly thick layer of amorphous silicic acid.

It has been found favorable to heat the quartz glass soot to a temperature in the range of 1,000°–1,250° C. during deposition, so that the layer is slightly sintered. The amorphous silicic acid layer is therefore mechanically stabilized and easier to handle. Thus, for example, the off-gases which could form during the deposition of the layer can be drawn off without carrying away any of the fine particles of amorphous silicic acid. When the layer is deposited by means of hydrolysis burners, the partial sintering indicated can be carried out very easily by means of the reaction heat of the burner gases.

It is advantageous for the quartz glass grains to be deposited continuously onto a conveyor belt. After the quartz glass grains have passed through the heating zone, they can be removed the conveyor belt and used again for substrate material.

The sintering temperature in the heating zone depends, among other things, on the speed at which the layer passes through the heating zone and the thickness of the soot layer.

The average residence time of each point of the layer in the heating zone is about 1 hour. The thicknesses of the soot layer is usually in the range of 10–30 mm. Under these conditions, sintering temperatures in the range of 1,300°–1,600° C. have been found to give favorable results.

After the layer leaves the heating zone, it is in the form of a vitrified quartz glass strip, which can be easily divided into individual plate-shaped elements. Plate thicknesses of up to about 10 mm can be produced by means of the process according to the invention.

With respect to the apparatus for the continuous production of plates of quartz or high silica glass, a transport device suitable for the transport of quartz glass grains, a loading device for depositing the quartz glass grains onto the transport device, a spray device for producing a layer of synthetic quartz glass soot on the quartz glass grains, and a heating device for heating the layer are provided.

The transport device according to the invention makes it possible for the system to operate continuously. An especially suitable transport device has a conveyor belt or a roller conveyor carrying heat-resistant plate elements which protect the conveyor belt from wear and are easy to replace. The conveyor belt or roller conveyor and the plates are preferably made of a heat resistant material such as $Al_2O_3$ or graphite. An embodiment of the device is preferred in which adjacent plate elements are connected to each other in such a way that, aside from a small gap between them, a closed surface is formed. The quartz glass grains can be deposited on this surface without falling through the gap between the plate elements.

An especially simple continuous process is obtained by the use of a device in which adjacent ends of the plate elements engage with each other in a hook-like manner. Plate elements of this design can be laid next to each other on the continuous conveyor belt to form a nearly closed, continuous surface. After the plate elements emerge from the heating device, they can then be lowered one by one, cleaned, and returned to the conveyor belt.

It is especially advantageous with respect to the continuous operation of the system for the spray device to consist of at least one hydrolysis burner, which can move back and forth in at least one direction over the quartz glass grains. This burner is used to deposit directly a layer of pyrogenic quartz glass soot onto the quartz glass grains. It is especially effective and inexpensive to use a device in which several hydrolysis burners are mounted on one or more extension arms, which can be moved back and forth in a direction crosswise to that in which the transport device moves, so that the hydrolysis burners also execute this back-and-forth movement while they deposit a layer of soot on the quartz glass grains. It is advantageous for the one or more extension arms to be designed to supply the reaction gases to the hydrolysis burners.

A system is preferred in which the heating device is designed in the form of a sintering chamber open at the bottom, which extends over the entire width of the soot layer, and which is provided with an electrical resistance heating unit. As a result, the layer can be vitrified uniformly over its entire width. In addition, the sintering chamber guarantees that every point of the soot layer remains at about the same temperature for the duration of its passage through the sintering chamber. This temperature can be lower than that for point-wise heating because of the longer duration of the heating process in the sintering chamber. As a result, homogeneous vitrification is achieved without damage to the layer.

DETAILED DESCRIPTION OF THE PREFERRED EMBODIMENT

Figure 1:
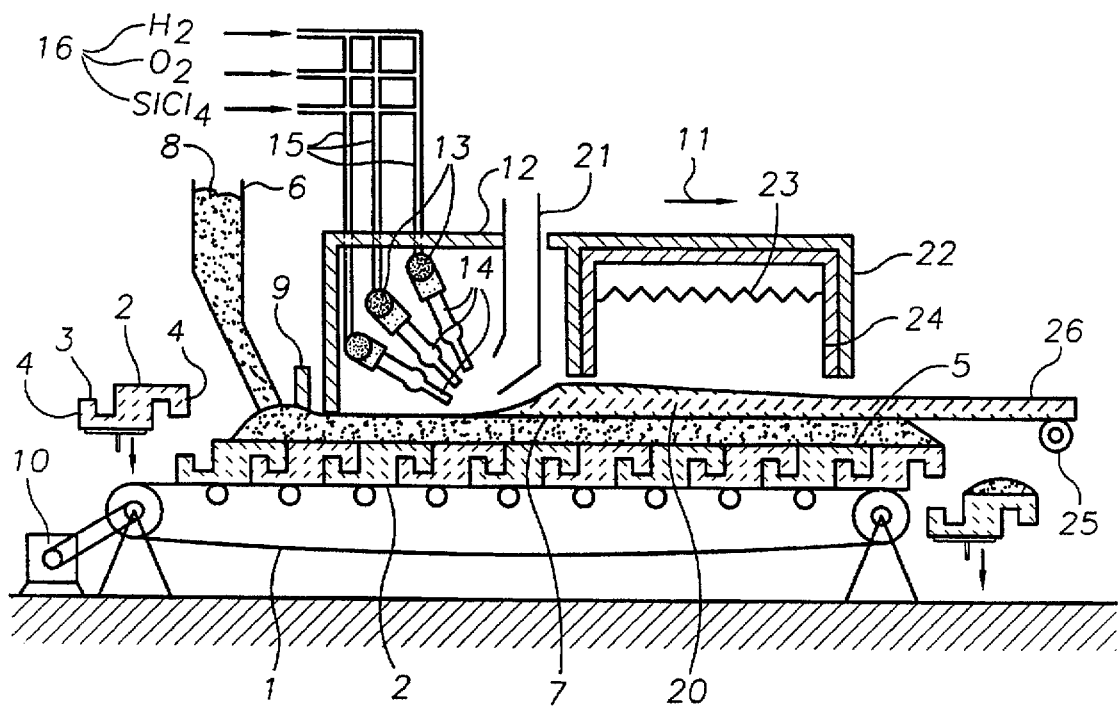
FIG. 1 is a schematic side section view of apparatus according to the invention, seen from the side.

In the system illustrated in FIG. 1, chain-like conveyor belt 1 made of $Al_2O_3$ supports temperature-resistant plate elements 2 of $Al_2O_3$, the hook-like ends 3 of which engage with each other. Plate elements 2 contact each other at their end surfaces 4 in such a way that, aside from a small gap, they form a closed support surface 5.

Above support surface 5 is mounted a loading hopper 6, from which a closed layer 7 of grains of quartz glass 8 of pyrogenic silicic acid is deposited onto support surface 5. A scraper 9 makes sure that the thickness and flatness of granular layer 7 remain uniform.

Figure 2:
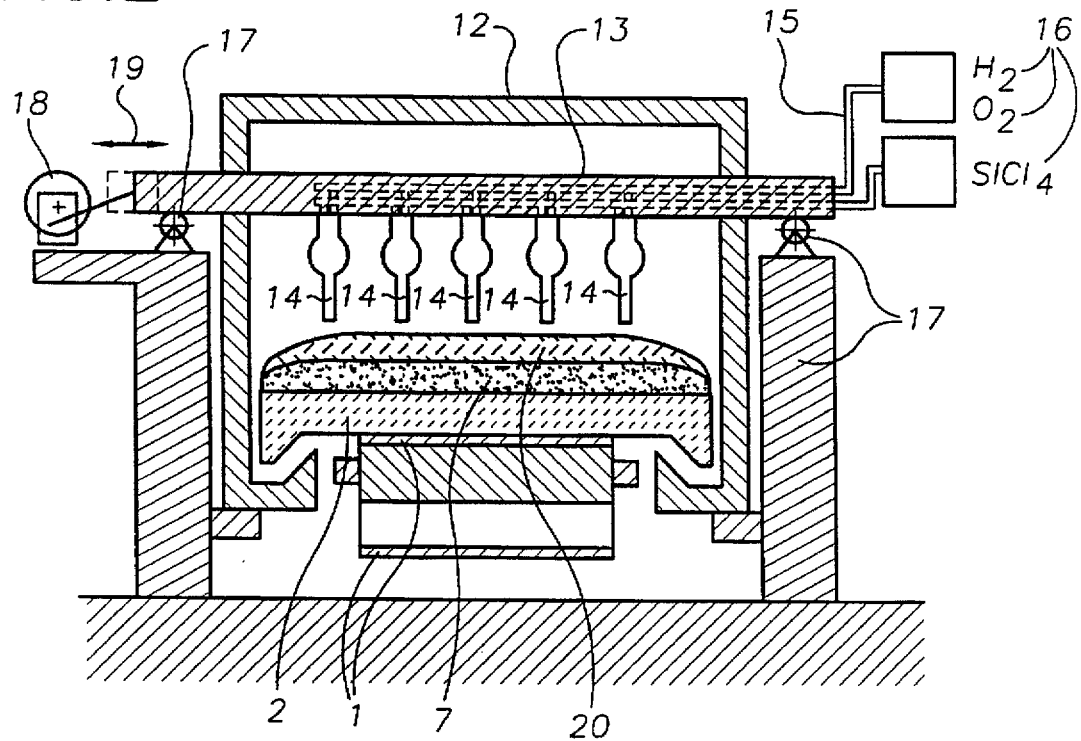
FIG. 2 is a schematic end section through a spray chamber.

Conveyor belt 1 can be driven by means of a drive 10 in the direction indicated by directional arrow 11. As a result, granular layer 7 enters a spray chamber 12. Here, several extension arms 13, extending crosswise to transport device 11, are installed, each of which carries several hydrolysis burners 14. Extension arms 13 are hollow, so that they serve as a continuation of supply lines 15 for the required burner gases 16, such as $SiCl_4$ vapor, $H_2$, and $O_2$. As can be seen from FIG. 2, extension arms 13 are provided on both sides with a suitable support 17. By means of a plunger drive 18, extension arms 13 are made to oscillate transversely to transport direction 11, as symbolized by motion arrow 19. By means of hydrolysis burners 14, a layer 20 of amorphous silicic acid is deposited on granular layer 7.

Opposite hydrolysis burners 14, a flue 21 is provided, through which the off-gases formed during the deposition of silicic acid layer 20 and excess amorphous silicic acid are conducted away to a purification system (not shown).

Seen in transport direction 11, flue 21 is followed by a sintering chamber 22, open at the bottom, which is equipped with an electrical resistance heating unit 23; walls 24 of the chamber are lined with a temperature resistant material. Sintering chamber 22 ensures that silicic acid layer 20 is heated uniformly over its entire width and that the sintering temperature is constant for each point of silicic acid layer 20 during its passage through sintering chamber 22. The quartz glass strip formed from amorphous silicic acid layer 20 on passage through sintering chamber 22 is sent on support rollers 25 to a cutting machine (not shown).

In the following, the production of quartz glass plates according to the process of the invention with the use of the system described above is described in exemplary manner. From of loading hopper 6, a granular layer 7 of pyrogenically produced and presintered quartz glass grains 8 is deposited onto conveyor belt 1, which is traveling at a speed of about 1 m/hr. By means of scraper 9, the thickness of granular layer 7 is adjusted to about 60 mm. In transport direction 11, finally, a thin layer 20 of amorphous silicic acid is deposited by means of hydrolysis burners 14 onto granular layer 7. Additional rows of burners increase the thickness of this layer 20 to 15 mm. Hydrolysis burners 14 arranged in rows on common extension arms 13 are angled with respect to the surface of granular layer 7 to point in transport direction 11. Hydrolysis burners 14 are made to oscillate 19 to ensure that the layer is built up uniformly. As a result of the heat from the burners, silicic acid layer 20 is heated to temperatures of around 1,100° C. and thus slightly presintered and mechanically stabilized. The off-gases which develop during the deposition process are drawn from spray chamber 12 through flue 21. The chemical composition of quartz glass grains 8 is the same as that of the amorphous silicic acid layer deposited as layer 20.

Amorphous silicic acid layer 20 thus deposited is then carried by means of conveyor belt into a sintering chamber 22, where it is vitrified at temperatures of around 1,400° C. The vitrification front advances uniformly from top to bottom through amorphous silicic acid layer 20 over the entire width of the layer. During the vitrification of amorphous silicic acid layer 20, the adhesion of layer 20 to granular layer 7 prevents the layer from contracting in either the length direction or the width direction. The thermal insulation provided by granular layer 7 with respect to conveyor belt 1 promotes the uniform sintering of amorphous silicic acid layer 20 over the entire width of the layer. In addition, granular layer 7 prevents quartz glass strip 26 from adhering to plate elements 2. As a result of this sintering operation, a plate-shaped quartz glass strip 26 with a thickness of about 5 mm or 30% of the original thickness of amorphous silicic acid layer 20 is obtained from amorphous silicic acid layer 20.

After plate elements 2 have emerged from sintering chamber 22, they are lowered to free quartz glass strip 26, which can then be sent via support rollers to a cutting machine, where it is divided into the desired lengths. The quartz glass plates thus produced are then polished, cleaned, and cut to size by the known processes.

We claim:

1. Process for the continuous production of plates of quartz glass comprising providing a substrate of quartz glass grains, depositing a layer of quartz glass soot on said substrate, said layer exhibiting a higher of sintering activity than said substrate, passing said layer continuously through a heating zone where the soot is heated sufficiently to cause fusion of the soot without causing fusion of the substrate, whereby said soot emerges from said heating zone in the form of a vitrified glass strip, and dividing said vitrified glass strip into plates.

2. Process as in claim 1 wherein said quartz glass grains are formed by sintering quartz glass soot.

3. Process as in claim 1 wherein said grains and said soot have the same chemical composition.

4. Process as in claim 1 wherein said quartz glass grains have an average grain size of 30–350 µm.

5. Process as in claim 1 wherein said layer of soot is deposited by a gas-phase reaction.

6. Process as in claim 5 wherein said layer of soot is deposited by moving hydrolysis burners back and for the over the substrate.

7. Process as in claim 1 wherein said layer of soot is heated during deposition to a temperature of 1000°–1250° C.

8. Process as in claim 1 wherein said quartz glass grains are applied continuously to conveyor means in order to form said substrate.

9. Process as in claim 1 wherein said heating zone is a sintering chamber maintained at 1300–1600° C.

* * * * *

UNITED STATES PATENT AND TRADEMARK OFFICE
CERTIFICATE OF CORRECTION

PATENT NO : 5,667,547
DATED : September 16, 1997
INVENTOR(S): Christiansen et al.

It is certified that error appears in the above-identified patent and that said Letters Patent is hereby corrected as shown below:

In column 2, line 65, change "contacts" to --contracts--.

In column 6, line 26, following "higher" insert --degree--.

Signed and Sealed this

Twenty-second Day of June, 1999

Attest:

Q. TODD DICKINSON

Attesting Officer

Acting Commissioner of Patents and Trademarks